(12) United States Patent
Kim et al.

(10) Patent No.: US 7,999,905 B2
(45) Date of Patent: Aug. 16, 2011

(54) APPARATUS FOR ASSEMBLING LIQUID CRYSTAL DISPLAY

(75) Inventors: Sungmin Kim, Busan (KR); Yongjin Kim, Gumi-si (KR); Byungsu Chae, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 333 days.

(21) Appl. No.: 12/453,884

(22) Filed: May 26, 2009

(65) Prior Publication Data
US 2010/0120320 A1    May 13, 2010

(30) Foreign Application Priority Data

Nov. 11, 2008  (KR) .................. 10-2008-0111694

(51) Int. Cl.
    *G02F 1/13* (2006.01)
(52) U.S. Cl. ........................... 349/187; 29/564.7
(58) Field of Classification Search .......... 349/187; 29/564.7; 44/66
    See application file for complete search history.

(56) References Cited

U.S. PATENT DOCUMENTS

| | | | |
|---|---|---|---|
| 6,398,610 B1* | 6/2002 | Inoue | 445/66 |
| 6,981,905 B2* | 1/2006 | Yakou et al. | 445/24 |
| 7,697,086 B2* | 4/2010 | Yang et al. | 349/58 |
| 7,777,827 B2* | 8/2010 | Park | 349/58 |

* cited by examiner

*Primary Examiner* — James Dudek
(74) *Attorney, Agent, or Firm* — McKenna Long & Aldridge LLP

(57) ABSTRACT

An apparatus for assembling a liquid crystal display is disclosed. The assembly apparatus includes a supply unit that supplies a board and backlight assembly including a backlight unit and a liquid crystal display panel received on the backlight unit at a predetermined assembly location, an assembly unit that in turn draws separated type chassis members from a cartridge, into which the separated type chassis members are loaded, and receives the separated type chassis members at edges of the board and backlight assembly supplied at the predetermined assembly location, and a screw coupling unit that screw-couples the separated type chassis members received at the edges of the board and backlight assembly.

16 Claims, 17 Drawing Sheets

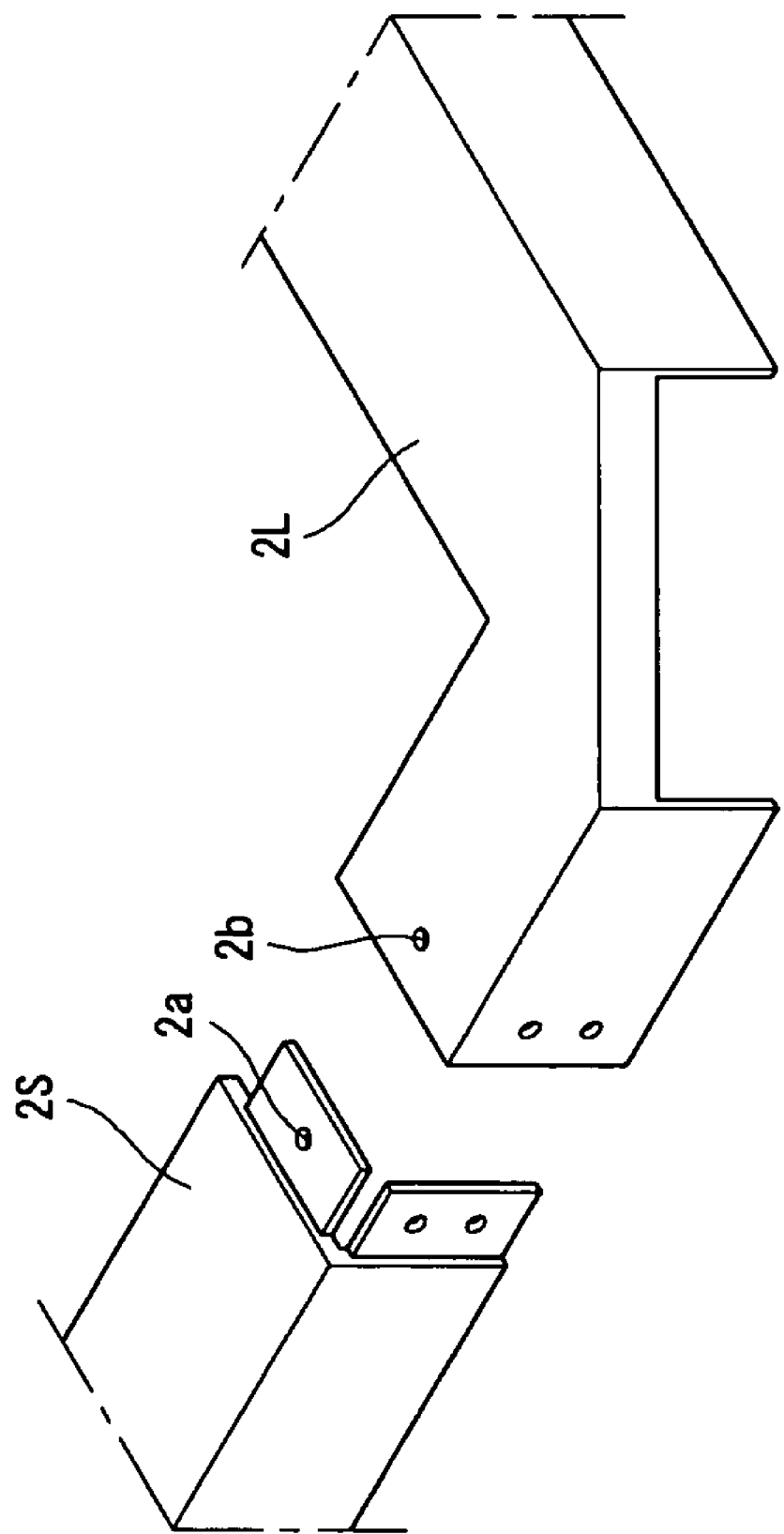

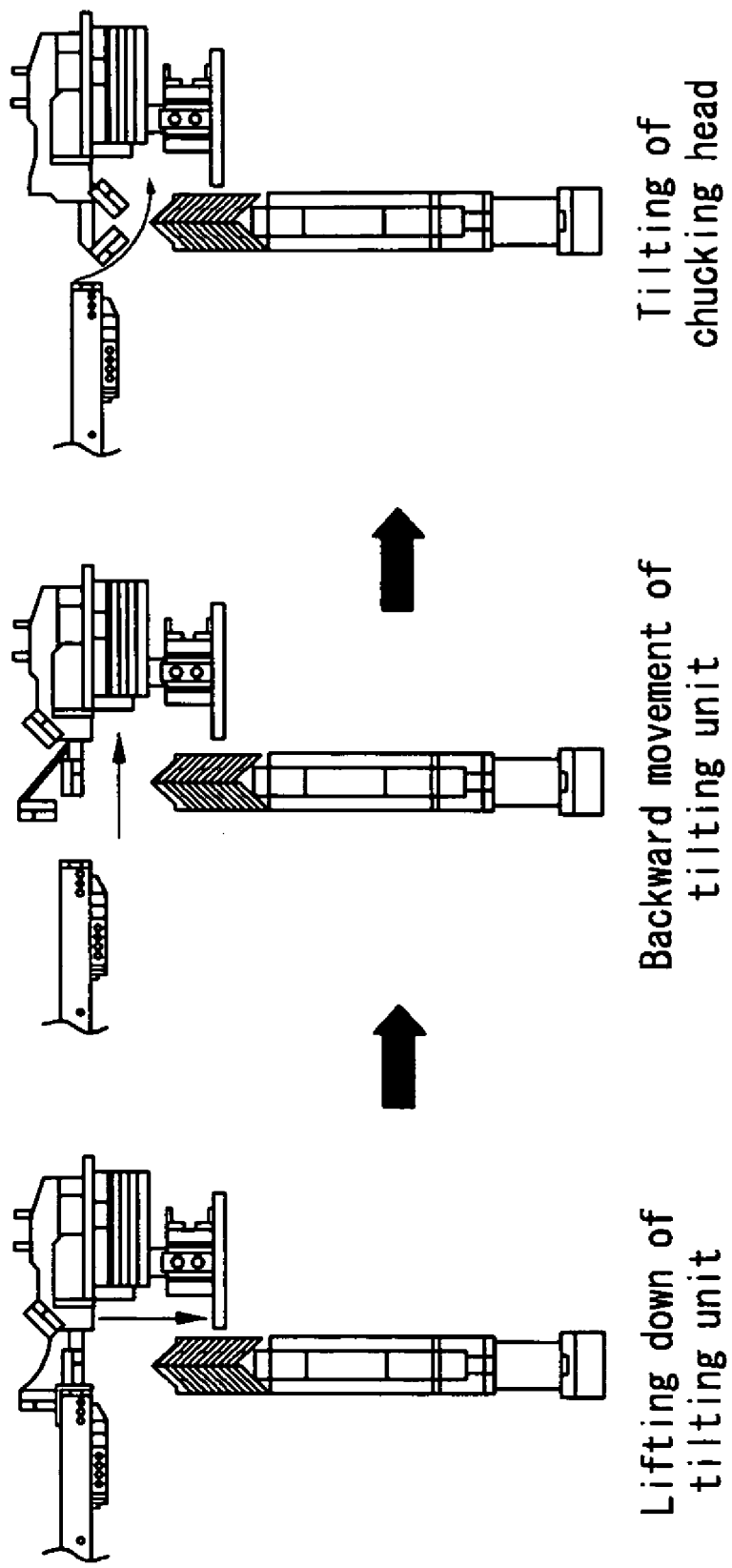

APPARATUS FOR ASSEMBLING LIQUID CRYSTAL DISPLAY

This application claims the benefit of Korea Patent Application No. 10-2008-0111694 filed on Nov. 11, 2008, the entire of contents of which is incorporated herein by reference for all purposes as if fully set forth herein.

BACKGROUND OF THE INVENTION

1. Field of the Invention

Embodiments of the invention relate to an apparatus for assembling a liquid crystal display.

2. Discussion of the Related Art

Active matrix type liquid crystal displays display a moving picture using a thin film transistor (TFT) as a switching element. The active matrix type liquid crystal displays have been implemented as televisions as well as display devices in portable devices, such as office equipment and computers, because of the thin profile of an active matrix type liquid crystal displays. Accordingly, cathode ray tubes (CRT) are being rapidly replaced by active matrix type liquid crystal displays.

A liquid crystal display includes a board assembly including a liquid crystal display panel, a backlight unit irradiating light onto the liquid crystal display panel, and various chassis members for fixing the board assembly and the backlight unit. With the recent development of a fabrication technology and a driving technology of liquid crystal displays, the size and a definition of the liquid crystal displays have been increasing. However, because the large-sized chassis members have to be used in the large-sized liquid crystal display, material cost and distribution cost of the large-sized liquid crystal display increase. Further, the cost of an assembly equipment for assembling the chassis members, an occupying space of the assembly equipment, and the number of assembly worker required increase.

SUMMARY OF THE INVENTION

Embodiments of the invention provide an apparatus for assembling a liquid crystal display capable of automatically assembling separated type chassis members to a board assembly and a backlight unit.

In one aspect, there is an apparatus for assembling a liquid crystal display comprising a supply unit that supplies a board and backlight assembly including a backlight unit and a liquid crystal display panel arranged on the backlight unit at a predetermined assembly location, an assembly unit that in turn draws separated type chassis members from a cartridge, into which the separated type chassis members are loaded, and arranges the separated type chassis members at edges of the board and backlight assembly supplied at the predetermined assembly location, and a screw coupling unit that screw-couples the separated type chassis members arranged at the edges of the board and backlight assembly.

In another aspect, there is an apparatus for assembling a liquid crystal display comprising a supply unit that supplies a board and backlight assembly including a backlight unit and a liquid crystal display panel arranged on the backlight unit at a predetermined assembly location, a first assembly unit that in turn draws first separated type chassis members from a first cartridge, into which the first separated type chassis members are loaded, and arranges the first separated type chassis members at one edge of the board and backlight assembly supplied at the predetermined assembly location, a first screw coupling unit that screw-couples the first separated type chassis members arranged at the one edge of the board and backlight assembly, a second assembly unit that in turn draws second separated type chassis members from a second cartridge, into which the second separated type chassis members are loaded, and arranges the second separated type chassis members at another edge of the board and backlight assembly supplied at the predetermined assembly location, and a second screw coupling unit that screw-couples the second separated type chassis members arranged at the another edge of the board and backlight assembly.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 3A and 3B are perspective views showing an assembly of separated type top cases;

FIGS. 8 to 10 are cross-sectional views sequentially showing each of stages in operations of a tilting unit and a cartridge;

DESCRIPTION OF THE ILLUSTRATED EMBODIMENTS

Figure 1:
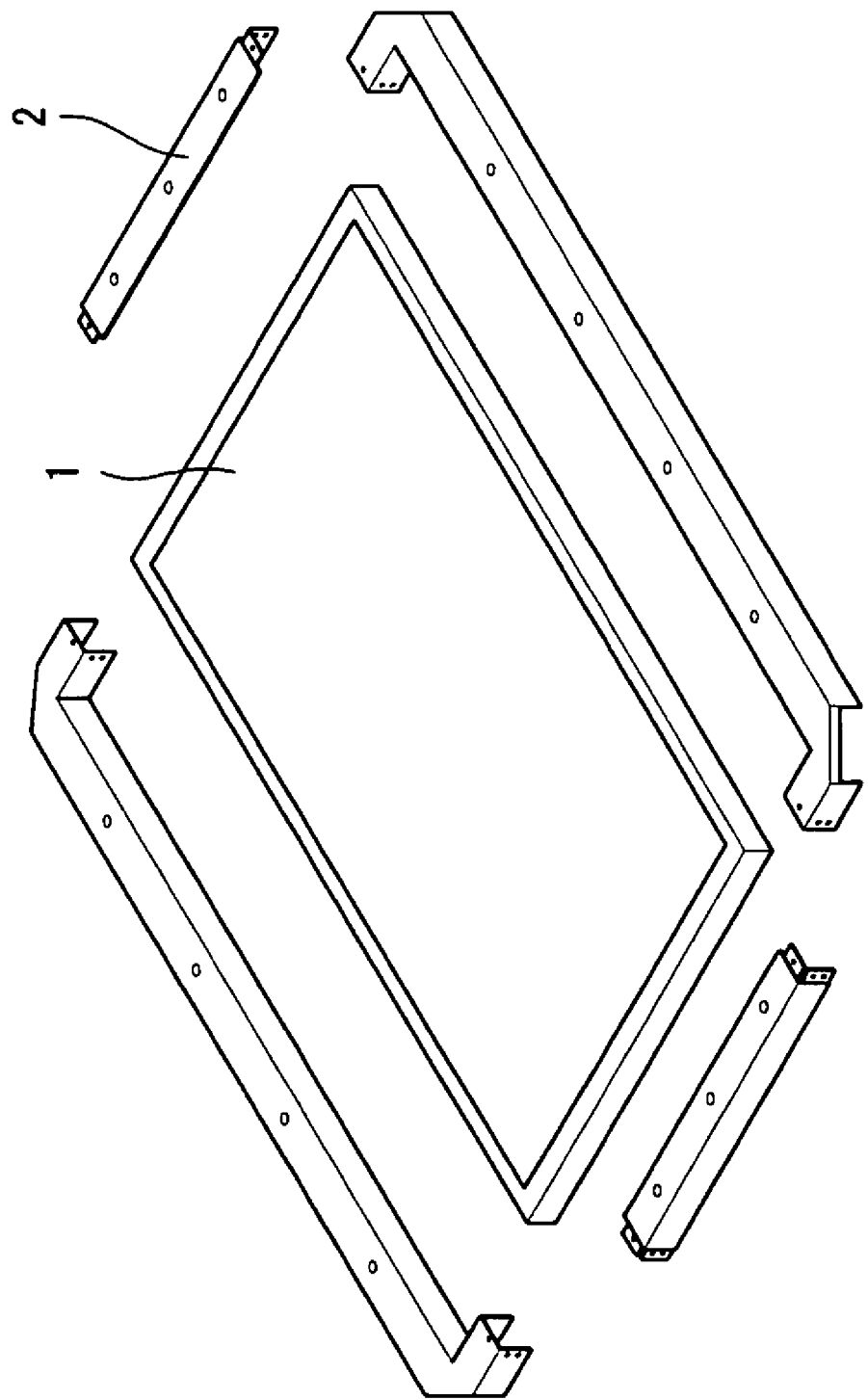
FIG. 1 is a perspective view of a board and backlight assembly and a separated type top case.
Figure 2:
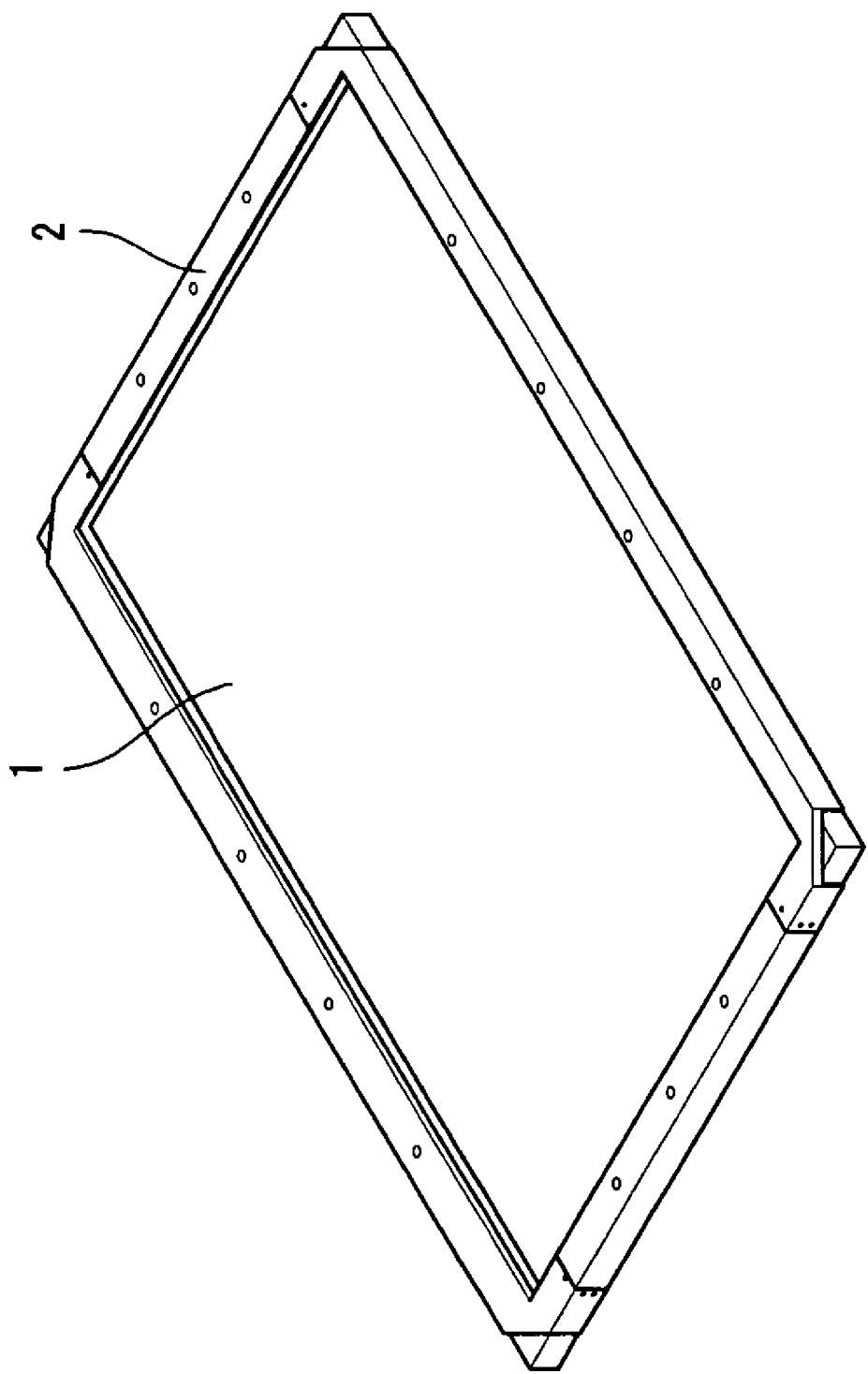
FIG. 2 is a perspective view showing a state in which separated type top cases are assembled to a board and backlight assembly.

A method of manufacturing a liquid crystal display according to embodiments of the invention includes a process for cleansing substrates of a liquid crystal display panel, a process for patterning the substrate, a process for forming and rubbing an alignment layer, a process for sealing the substrates and dropping liquid crystals, a process for mounting driving circuits, an inspection process, a repair process, a process for assembling a backlight unit, a process for assembling a board assembly and the backlight unit, and the like.

The substrate cleansing process is a process for removing polluted materials from the surfaces of upper and lower glass substrates of the liquid crystal display panel using a cleansing solution. The substrate patterning process includes a process for forming and patterning various thin film materials, such as signal lines including data lines and gate lines, thin film transistors (TFTs), and pixel electrodes, on the lower glass substrate and a process for forming and patterning various thin film materials, such as a black matrix, a color filter, and a common electrode, on the upper glass substrate. In the process for forming and rubbing the alignment layer, alignment layers are respectively coated on the glass substrates, and then are rubbed using a rubbing cloth or are photo-alignment processed. After the above-described processes are performed, a pixel and a TFT array are formed on the lower glass substrate of the liquid crystal display panel. The pixel includes the data lines receiving a video data voltage, the gate lines that cross the data lines and sequentially receive scan signals (i.e., gate pulses), the TFTs at each of crossings of the data lines and the gate lines, the pixel electrodes of liquid crystal cells respectively connected to the TFTs, a storage capacitor, and the like. A shift register of a gate drive circuit generating the scan signals may be formed at the same time as the pixel and the TFF array during the substrate patterning process. The black matrix, the color filter, and the common electrode are formed on the upper glass substrate of the liquid crystal display panel. The common electrode is formed on the upper glass substrate in a vertical electric drive manner, such as a twisted nematic (TN) mode and a vertical alignment (VA) mode. The common electrode and the pixel electrode are formed on the lower glass substrate in a horizontal electric drive manner, such as an in-plane switching (IPS) mode and a fringe field switching (FFS) mode. Polarizing plates are attached respectively to the upper and lower glass substrates, and protective films are attached respectively to the polarizing plates.

In the process for sealing the substrates and dropping the liquid crystals, a sealant is drawn on one of the upper and lower glass substrates, and the liquid crystals are dropped onto the other glass substrate in a vacuum chamber. Supposing that the liquid crystals are dropped onto the lower glass substrate, an ultraviolet curable sealant is formed on the upper glass substrate. The upper glass substrate on which the ultraviolet curable sealant is formed is reversed and is fixed on an upper stage, and the lower glass substrate onto which the liquid crystals are dropped is fixed on a lower stage in the vacuum chamber. Hence, the upper and lower glass substrates are aligned. Subsequently, a pressure is applied to one of the upper and lower glass substrates in a vacuum state formed by driving a vacuum pump to seal the upper and lower glass substrates to each other. In this case, a cell gap of a liquid crystal layer between the upper and lower glass substrates is set at a greater value than a cell gap set in the design. Subsequently, nitrogen ($N_2$) is injected into the vacuum chamber to change the pressure of the vacuum chamber into an atmospheric pressure. Hence, the cell gap of the liquid crystal layer is set at the cell gap set in the design because of a difference between the pressure inside the sealed glass substrates and the atmospheric pressure in the vacuum chamber. In this state, ultraviolet rays are incident on the sealant through the upper glass substrate by turning on an ultraviolet light source to cure the sealant.

In the process for mounting the driving circuit, integrated circuits (ICs) of the data drive circuit are mounted on the lower glass substrate through a chip on glass (COG) process or a tape automated bonding (TAB) process. ICs of the gate drive circuit may be mounted on the lower glass substrate through the above-described process. Otherwise, the ICs of the gate drive circuit may be coupled to the lower glass substrate through the TAB process. Subsequently, the ICs and a printed circuit board (PCB) are connected to a flexible printed circuit board (FPC) or a flexible flat cable (FFC).

The inspection process includes an inspection of ICs, inspection of the signal lines such as the data lines and the gate lines on the lower glass substrate, an inspection conducted after the pixel electrodes are formed, an inspection conducted after the process for sealing the substrates and dropping the liquid crystals is performed, an lighting inspection, and the like. The repair process is performed on defective signal lines and defective FTFs that are determined as a repairable defective through the inspection process.

The board assembly is completed through the above-described processes. As described above, the board assembly includes the liquid crystal display panel having the liquid crystals between the upper and lower glass substrates, the polarizing plates attached respectively to the upper and lower glass substrates, and various circuit elements that connect the data drive ICs and the gate drive ICs to the data lines and the gate lines.

The process for assembling the backlight unit includes a process for assembling an edge light type backlight unit and a process for assembling a direct light type backlight unit. The process for assembling the edge light type backlight unit includes a process for assembling a light source, a reflective sheet, a light guide plate, a diffusion sheet, and a prism sheet on a mold frame, a process for assembling a panel guide on the mold frame, and a process for connecting an inverter to the light source. In the process for assembling the direct light type backlight unit, after a light source is received inside a bottom cover whose an top portion is open, a mold frame, a diffusion plate, a diffusion sheet, a prism sheet, and a panel guide are assembled on the bottom cover. Then, an inverter is connected to the light source. The light source may be one of a cold cathode fluorescent lamp (CCFL), an external electrode fluorescent lamp (EEFL), and a light emitting diode (LED). Further, the light source may be a combination of the lamp and the LED. The inverter is a power driving circuit for turning on the light source.

The process for assembling the board assembly and the backlight unit includes a process for peeling the protective film attached to the liquid crystal display panel of the board assembly, a process for arranging the board assembly on the backlight unit, and a process for automatically assembling a separated type chassis member to the board assembly and the backlight unit using an assembly apparatus shown in FIGS. 4 to 14.

Figure 3B:
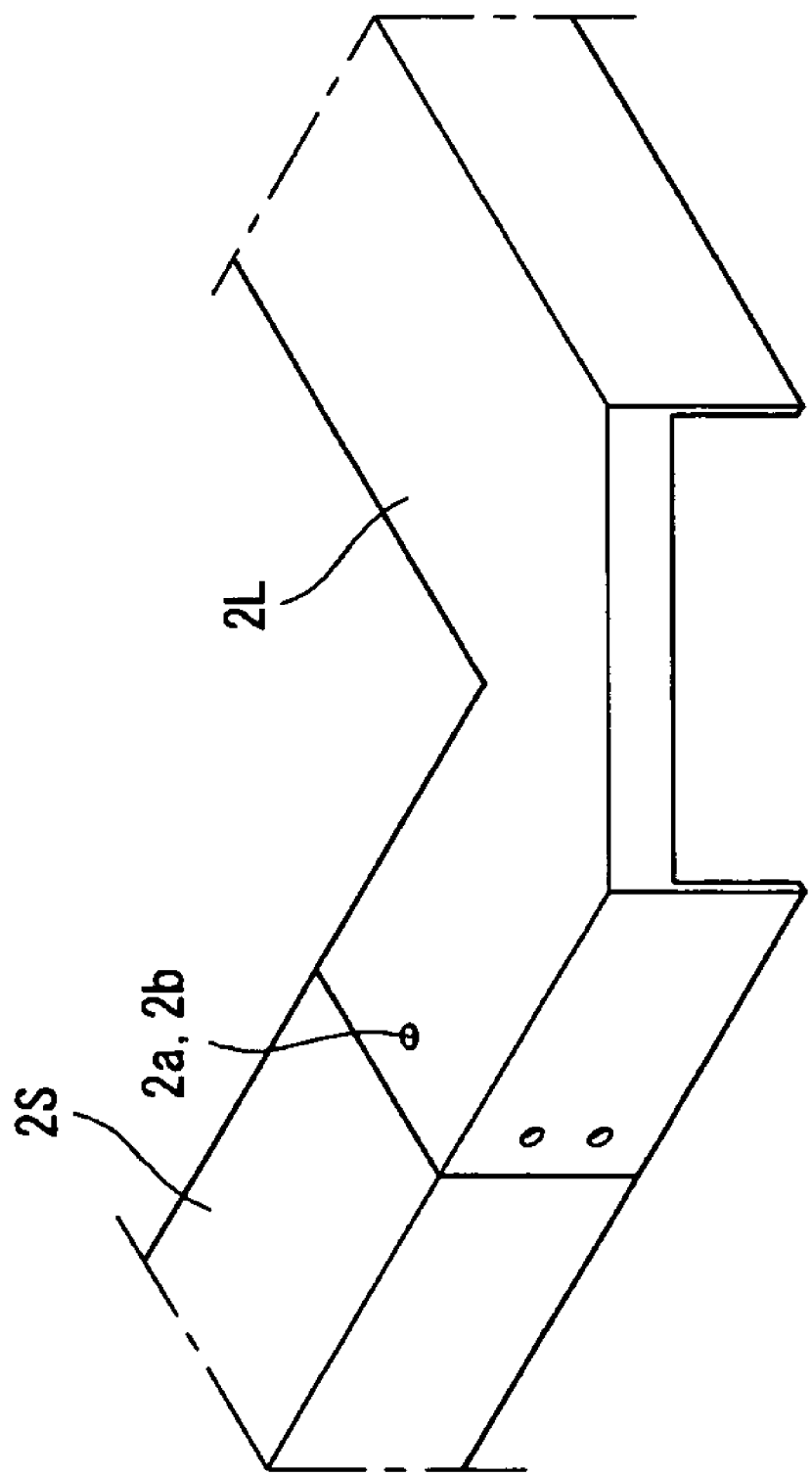

The separated type chassis member includes various chassis members for assembling the backlight unit and the board assembly arranged on the backlight unit into an integral body. Hereinafter, the backlight unit and the board assembly arranged on the backlight unit are referred to as a board and backlight assembly. FIGS. 1 to 3B illustrate an exemplary structure of a separated type top case as an example of the separated type chassis member. The Separated type top cases 2 include 4 four top cases 2L and 2S assembled at upper, lower, left, and right sides of a board and backlight assembly 1. Shorter side top cases 2S are assembled at edges of left and right shorter sides of the board and backlight assembly 1, and longer side top cases 2L are assembled at edges of upper and lower longer sides of the board and backlight assembly 1. As shown in FIGS. 3A and 3B, screw tapping holes 2a and 2b are respectively formed at ends of the top cases 2L and 2S. The separated type top cases 2 has an engagement structure in which ends of the shorter side top cases 2S are engaged with ends of the longer side top cases 2L opposite the ends of the shorter side top cases 2S. When the two top cases 2L and 2S are engaged with each other, the screw tapping holes 2a and 2b fit perfectly. The top cases 2L and 2S are fastened by screws passing through the screw tapping holes 2a and 2b.

FIGS. 4 to 11C illustrate an apparatus for assembling a liquid crystal display according to a first exemplary embodiment of the invention.

Figure 4:
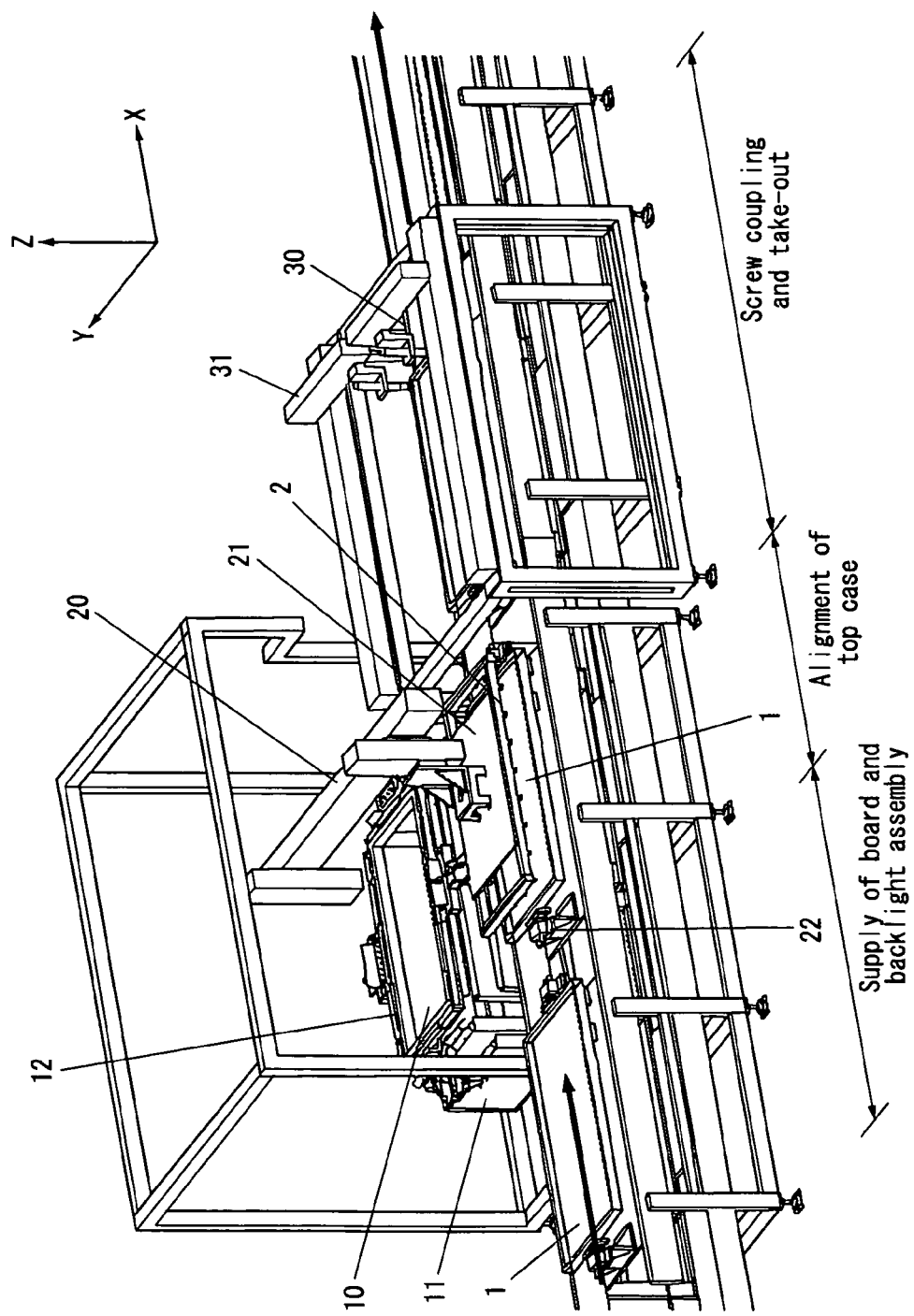
FIG. 4 is a perspective view of an apparatus for assembling a liquid crystal display according to a first exemplary embodiment of the invention.
Figure 5:
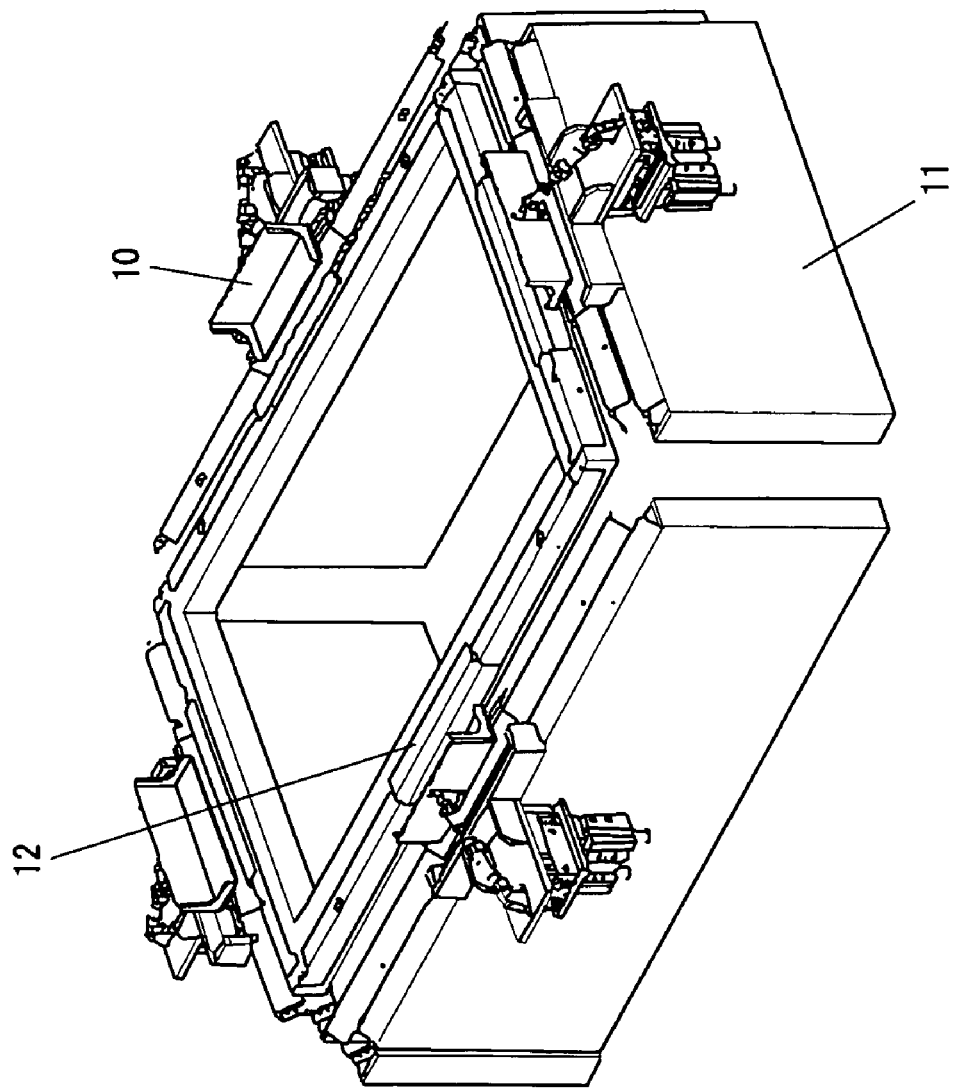
FIG. 5 is a perspective view showing in detail a tilting unit, a cartridge, and a quadrangular frame-shaped jig.
Figure 6:
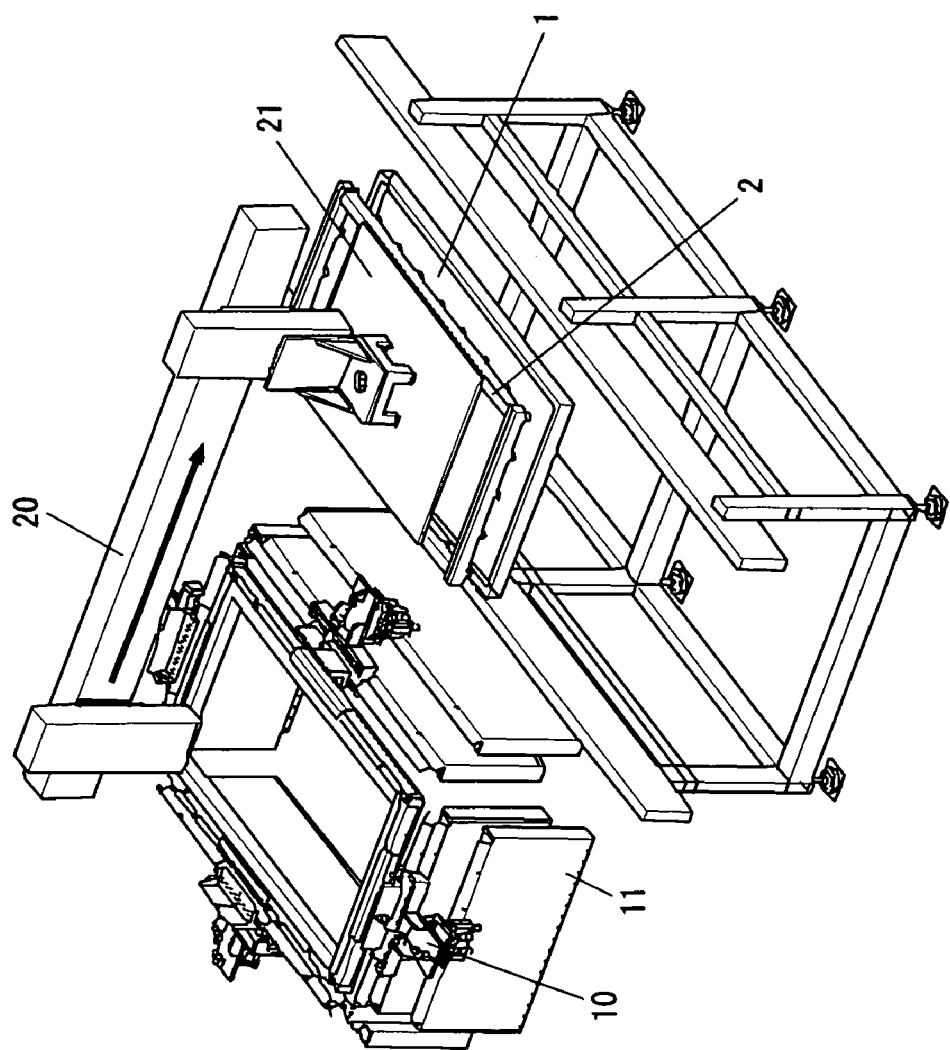
FIG. 6 is a perspective view showing in detail a tilting unit, a cartridge, a quadrangular frame-shaped jig, and a transfer robot.

As shown in FIG. 4, an assembly apparatus of a liquid crystal display has a board and backlight assembly supply unit, a top case arranging unit, a screw coupling and take-out unit, and a controller for controlling operation timing of the above components. The controller may be implemented as a programmable logic controller (PLC) system.

The board and backlight assembly supply unit transfers the board and backlight assembly 1 to the top case arranging unit under the control of the controller. The board and backlight assembly supply unit includes a conveyer unit and a chucking unit 22 mounted on the conveyer unit. The chucking unit 22 holds both sides of the board and backlight assembly 1, and the conveyer unit transfers the chucking unit 22 to the top case arranging unit in a direction of an arrow shown in FIG. 4. Before the board and backlight assembly 1 is transferred to the top case arranging unit, the controller controls a vision system (not shown) and a fine adjustment unit interlocked with the vision system in x-axis, y-axis, and θ directions to align the board and backlight assembly 1 at a reference location for the top case assembly and receipt.

The top case arranging unit includes a plurality of tilting units 10, a plurality of cartridges 11, a quadrangular frame-shaped jig 12, and a top case transfer robot 20 As shown in FIGS. 4 to 7.

Figure 8:
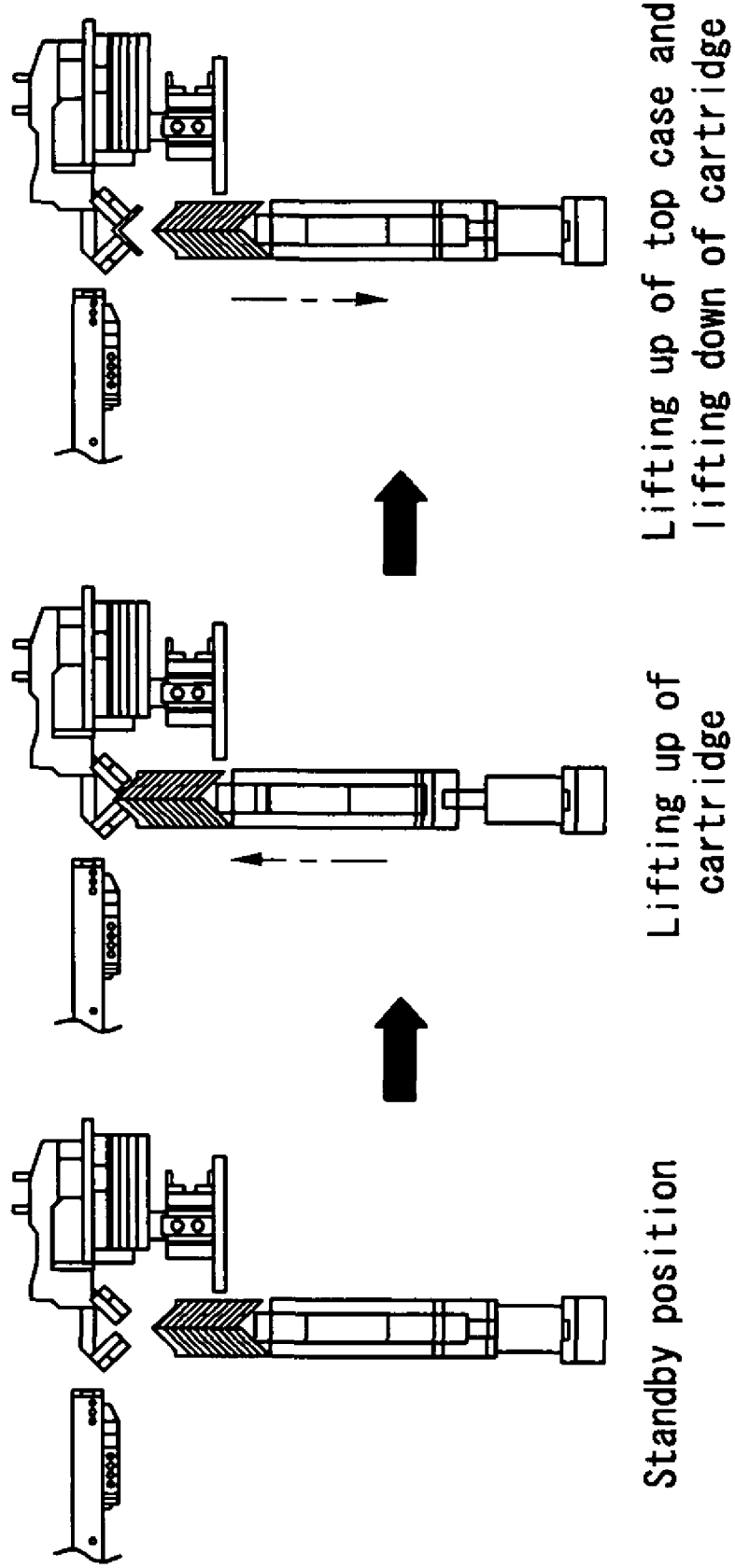
Figure 9:
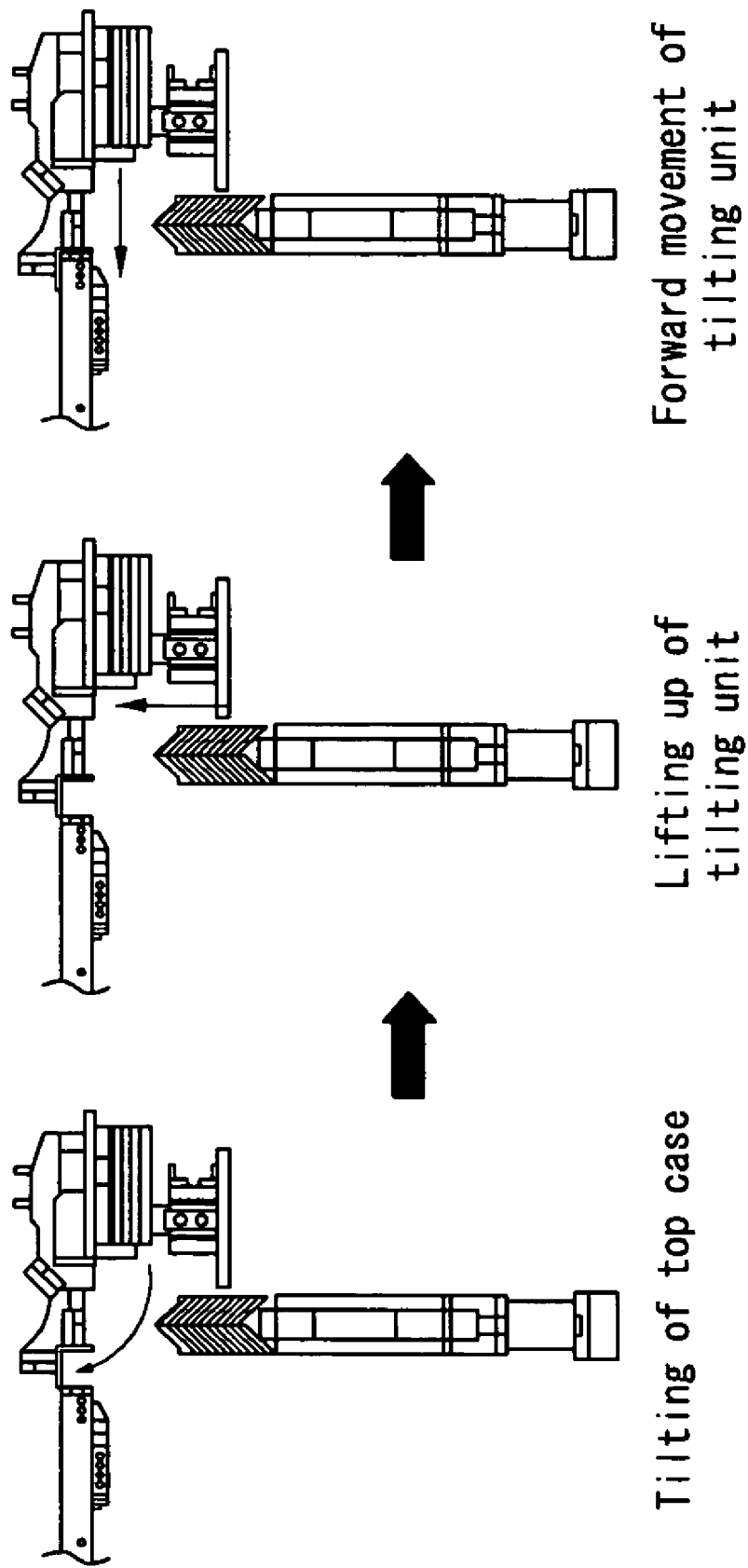

The cartridge 11 includes cartridges 11 into which the plurality of identical longer side top cases 2L are loaded and whose upper portions are open, and cartridges 11 into which the plurality of identical shorter side top cases 2L are loaded and whose upper portions are open. The separated type top cases 2 have an L-shaped section and are loaded in a reversed state inside the cartridges 11. Therefore, the separated type top cases 2 are loaded in □ shape into the cartridges 11. The tilting unit 10 includes a vacuum pad or an electromagnet. The tilting unit 10 draws the □-shaped separated type top cases 2 one by one from the cartridge 11 and rotates the separated type top cases 2 by approximately 90° to receive the separated type top cases 2 in a rectangular stepped jaw portion of the quadrangular frame-shaped jig 12. As shown in FIGS. 8 to 10, the cartridges 11 is driven by an elevation cylinder and is interlocked with the tilting units 10 to lift up and down the separated type top cases 2. The controller controls an air pressure supplied to a driving cylinder of the tilting unit 10 and a driving cylinder of the cartridge 11 to control a mutual interlock of the cartridge 11 and the tilting unit 10, as shown in FIGS. 8 to 10. Further, the controller controls a vacuum pressure supplied to the tilting unit 10 or a current of an electromagnet.

Each cartridge 11 has a preliminary cartridge so as to reduce time required to exchange the cartridge for a new cartridge. Therefore, the cartridges may be configured in pairs. The assembly apparatus of the liquid crystal display may further include a robot unit that changes locations of a pair of cartridges depending on a remaining amount of the top cases loaded into the cartridge 11. The assembly apparatus of the liquid crystal display may further include a sensor that senses a remaining amount of the top cases received inside the cartridge 11. The controller analyzes a sensor signal to senses a remaining amount of the separated type top case inside the cartridge 11 in real-time. Hence, the controller controls the robot unit to automatically exchange the cartridge in which the loaded top cases 2 are all spent for a preliminary cartridge in which the top cases 2 are fully loaded.

The size of the quadrangular frame-shaped jig 12 depends on the size of the board and backlight assembly 1. The quadrangular frame-shaped jig 12 may have a plurality of fit pins so that the quadrangular frame-shaped jig 12 can be used in various liquid crystal displays each having a different size and shape. The fit pins automatically align the separated type top cases 2 at a reference location determined when the separated type top cases 2 are safely arranged in the quadrangular frame-shaped jig 12. The separated type top cases 2 are safely arranged in the quadrangular frame-shaped jig 12 by the tilting unit 10. The top case transfer robot 20 is implemented as a biaxial robot that adsorbs the entire separated type top cases which are aligned in a quadrangular frame shape by lifting down a head 21 of the top case transfer robot 20 in a z-axis direction, and then is transferred in a y-axis direction by lifting up the head 21. The top case transfer robot 20 safely transfers the separated type top cases 2 aligned in the quadrangular frame shape to the board and backlight assembly 1 and then aligns the separated type top cases 2 on the board and backlight assembly 1. The head 21 of the top case transfer robot 20 includes a vacuum absorption pad or an electromagnet and is safely arranged on the quadrangular frame-shaped jig 12. The controller controls a vacuum pressure and a magnetic force of the head 21 and controls the top case transfer robot 20 so that the separated type top cases 2 aligned in the quadrangular frame shape is transferred between the quadrangular frame-shaped jig 12 and the board and backlight assembly 1.

The screw coupling and take-out unit includes a convey unit for transferring the chucking unit 22, a multi-axial robot 31 to which an automatic screw driver unit 30 is fastened, and the like. The convey unit transfers the chucking unit 22 in an x-axis direction and supplies the board and backlight assembly 1 in which the top cases 2 are safely arranged to the screw coupling and take-out unit. After a screw coupling process is performed, the convey unit transfers the chucking unit 22 in the x-axis direction and take the board and backlight assembly 1 out of the screw coupling and take-out unit. The multi-axial robot 31 transfers the automatic screw driver unit 30 to a screw coupling location of the separated type top cases 2 aligned at edges of the board and backlight assembly 1 under the control of the controller. The automatic screw driver unit 30 rotates screws automatically supplied at the screw coupling location to screw-couple the screws with the screw tapping holes 2a and 2b of the separated type top cases 2. The top cases are fixed at the edges of the board and backlight assembly 1 due to the screw coupling. The conveyer unit transfers the chucking unit 22 to take the board and backlight assembly 1 and the screw-coupled top cases at the edges of the board and backlight assembly 1 out of the screw coupling and take-out unit in the arrow direction shown in FIG. 4.

Figure 7:
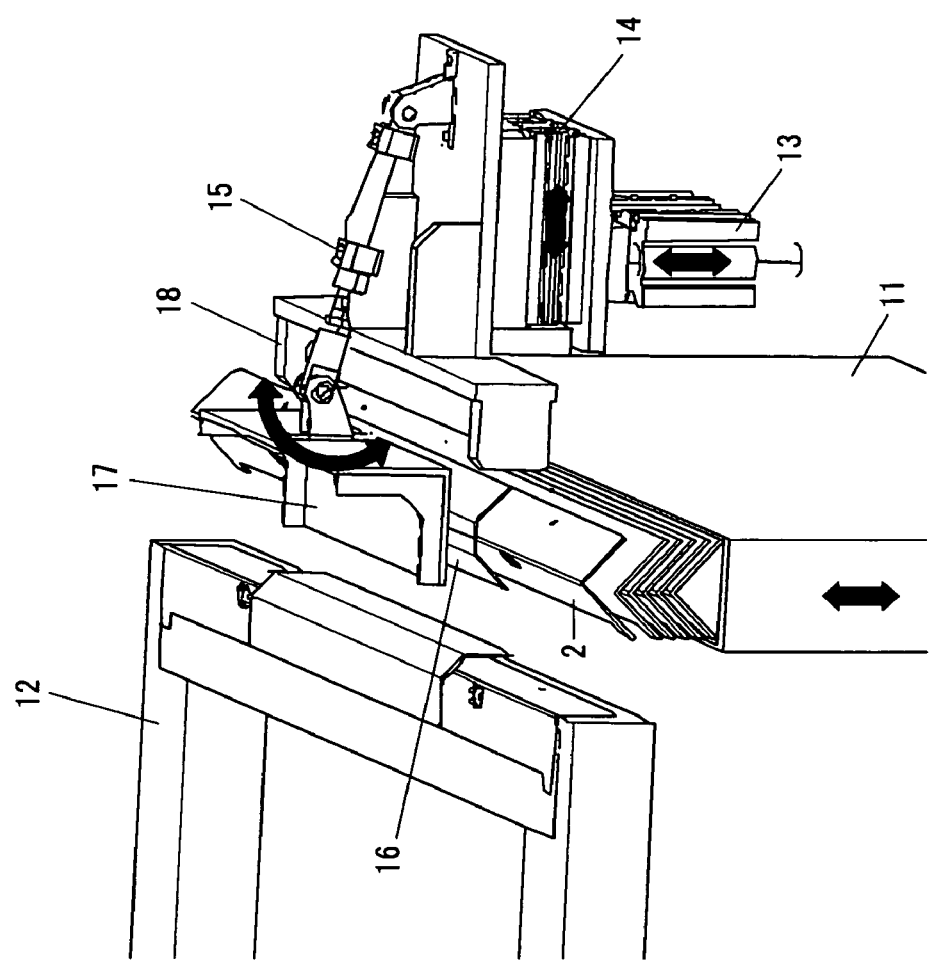
FIG. 7 is a perspective view enlargedly showing a tilting unit.

As shown in FIG. 7, the tilting unit 10 has a chucking head 16, a hinge block 17, a tilting cylinder 15, a forward and backward cylinder 14, an elevation cylinder/motor 13, and the like. The tilting unit 10 is installed in a block 18 installed around the quadrangular frame-shaped jig 12.

The chucking head 16 includes a vacuum adsorption pad or an electromagnet to adsorb the separated type top case 2. The hinge block 17 supports the chucking head 16 and is connected to a load of the tilting cylinder 15 via a hinge shaft. After the hinge block 17 adsorbs the separated type top case 2 from the cartridge 11, the hinge block 17 rotates by about 90° about the hinge shaft depending on a forward or backward movement of the load of the tilting cylinder 15 to adjust a position of the separated type top case 2 so that the position of the separated type top case 2 is fitted to the rectangular stepped jaw portion of the quadrangular frame-shaped jig 12. The tilting cylinder 15 is hinge-coupled with the hinge block 17 and is hinge-coupled with a moving block 19 coupled with a load of the forward and backward cylinder 14. The tilting cylinder 15 rotates the chucking head 16 and the hinge block 17 by forward and backward moving the load of the forward and backward cylinder 14 under the control of the controller. The load of the forward and backward cylinder 14 is fastened to the moving block 19. The forward and backward cylinder 14 forward and backward moves the moving block 19, the tilting cylinder 15, the hinge block 17, and the chucking head 16 under the control of the controller. A load of the elevation cylinder/motor 13 is connected to a body of the forward and backward cylinder 14. The elevation cylinder/motor 13 may be implemented as one of a motor and an air cylinder. The elevation cylinder/motor 13 lifts up and down the forward and backward cylinder 14, the moving block 19, the tilting cylinder 15, the hinge block 18, the chucking head 16, and the like, under the control of the controller.

FIGS. 8 to 10 sequentially illustrate each of stages in operations of the tilting unit 10 and the cartridge 11 that are interlocked with each other under the control of the controller.

As shown in FIG. 8, the elevation cylinder 13 under the cartridge 11 at a standby position backward moves a load of the elevation cylinder 13 under the control of the controller to lower a height of the cartridge 11 at the standby position. At the standby position, the chucking head 16 of the tilting unit 10 is directed toward the cartridge 11. Subsequently, the cartridge 11 is lifted up depending on a forward movement of the load of the elevation cylinder 13. The uppermost separated type top case 2 is adsorbed to the chucking head 16 of the tilting unit 10 due to the lifting up of the cartridge 11. After the uppermost separated type top case 2 is attached to the chucking head 16, the elevation cylinder 13 under the cartridge 11 backward moves the load of the elevation cylinder 13 to lift down the cartridge 11.

Subsequently, as shown in FIG. 9, after the controller backward moves the load of the tilting cylinder 15 to clockwise rotate the hinge block 17 and the chucking head 16 by about 90°, the controller forward moves the load of the elevation cylinder/motor 13 to lift up the hinge block 17, the chucking head 16 adsorbing the separated type top case 2, the tilting cylinder 15, the moving block 19, the forward and backward cylinder 14, and the like. After the tilting unit 10 is lifted up, the controller forward moves the load of the forward and backward cylinder 14 to forward move the hinge block 17, the chucking head 16 adsorbing the separated type top case 2, the tilting cylinder 15, the moving block 19, and the like. Hence, the separated type top case 2 is arranged in the quadrangular frame-shaped jig 12 so that the position of the separated type top case 2 is fitted to the rectangular stepped jaw portion of the quadrangular frame-shaped jig 12.

Subsequently, as shown in FIG. 10, the controller backward moves the load of the elevation cylinder 13 under the cartridge 11 to lift down the cartridge 11 and backward moves the load of the forward and backward cylinder 14 of the tilting unit 10 to backward move the tilting unit 10. Then, the controller upward moves the load of the tilting cylinder 15 to counter-clockwise rotate the hinge block 17 and the chucking head 16 by about 90°. As a result, the tilting unit 10 and the cartridge 11 are initialized to the standby position illustrated in FIG. 8.

Figure 11A:
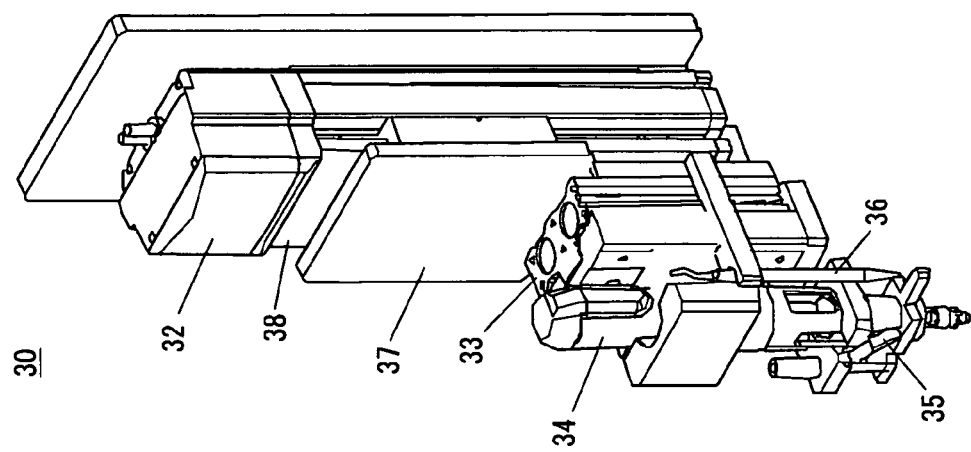
FIGS. 11A to 11C are a perspective view, a front view, and a lateral view showing in detail an automatic screw driver unit, respectively.
Figure 11B:
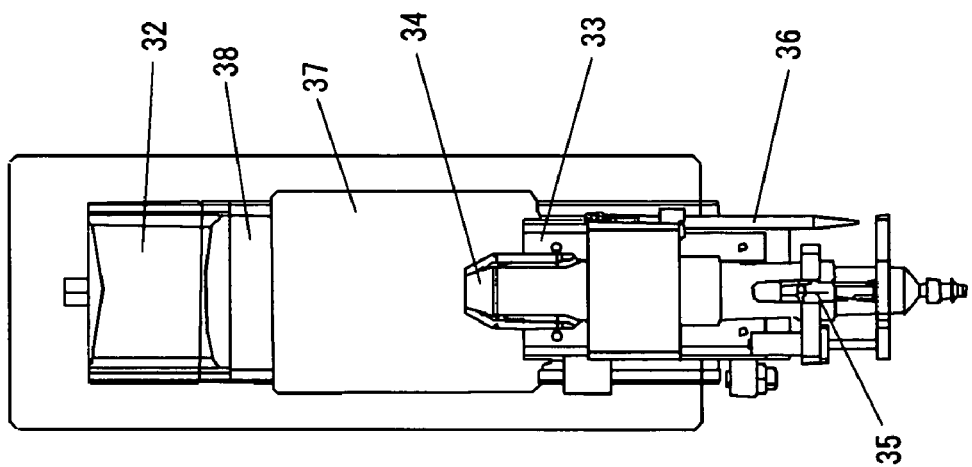
Figure 11C:
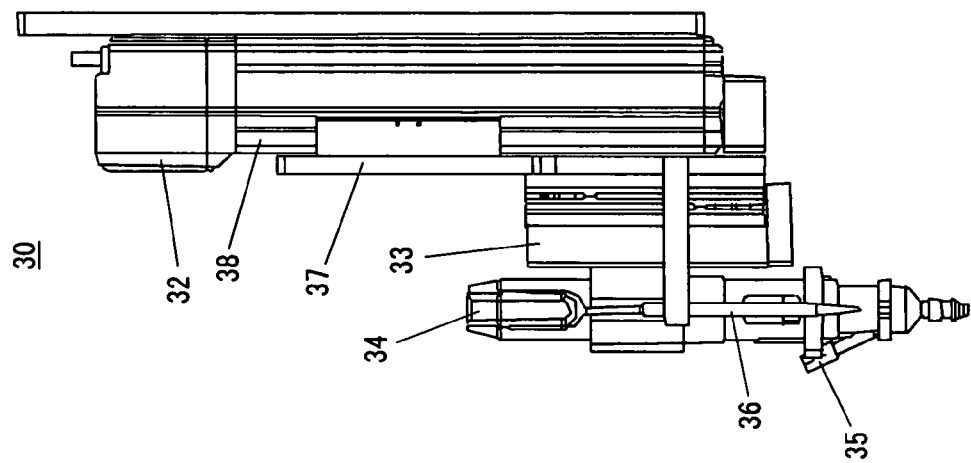

FIGS. 11A to 11C illustrate the automatic screw driver unit 30 viewed at various angles.

As shown in FIGS. 11A to 11C, the automatic screw driver unit 30 has an automatic screw driver 34, a screw supplier 35, a z-axis defective sensor 36, a buffer air cylinder 33, a slider 37, a guide 38, a z-motor 32, and the like.

The automatic screw driver 34 rotates a screw using an electrical power or air pressure. In the automatic screw driver unit 30, the number of electric motion drivers 34 and a stroke of the automatic screw driver unit 30 are determined by the number of screw couplings and a screw coupling location. The screw supplier 35 automatically supplies a plurality of screws to the automatic screw driver 34 in an air shooting manner. The screw supplier 35 has a sensor. The sensor senses the number of screws remaining in the screw supplier 35 to transmit a sensing result to the controller. A supply defective sensor may be installed around a screw supply hose so as to check the screw supply defective. The z-axis defective sensor 36 senses a distance between the automatic screw driver 34 and the separated type top case 2 to transmit a sensing result to the controller. The buffer air cylinder 33 absorbs a vibration of the automatic screw driver 34 when the screw coupling of the separated type top cases 2 is performed. The buffer air cylinder 33 is fastened to the slider 37. The slider 37 is driven by the z-axis motor 32 under the control of the controller to lift up the automatic screw driver 34, the screw supplier 35, the z-axis defective sensor 36, and the buffer air cylinder 33 along the guide 38 in a z-axis direction.

The controller analyze a torque signal of the automatic screw driver 34 to thereby previously sense a failure of screw coupling (for example, a case where a screw is not supplied to the automatic screw driver 34 or a case where a screw is separated from the automatic screw driver 34 before a screw coupling). The controller analyze a signal of the z-axis defective sensor 36 to thereby sense a failure of screw coupling (for example, a case where a screw is obliquely coupled or a case where a screw does not fully rotate because a depth of a screw thread is not equal to a depth of the screw tapping hole).

Figure 12:
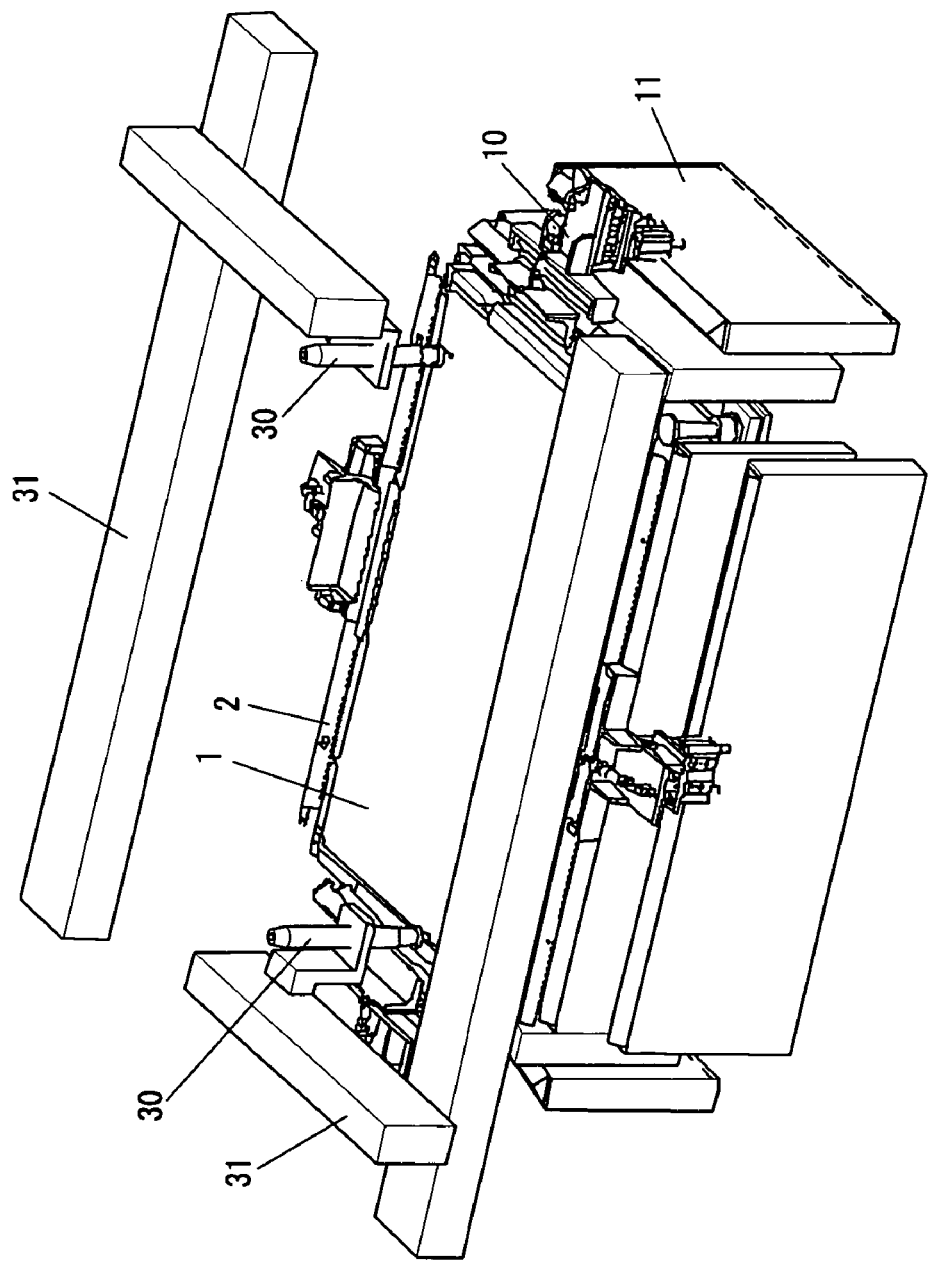
FIGS. 12 and 13 are perspective views of an apparatus for assembling a liquid crystal display according to a second exemplary embodiment of the invention.
Figure 13:
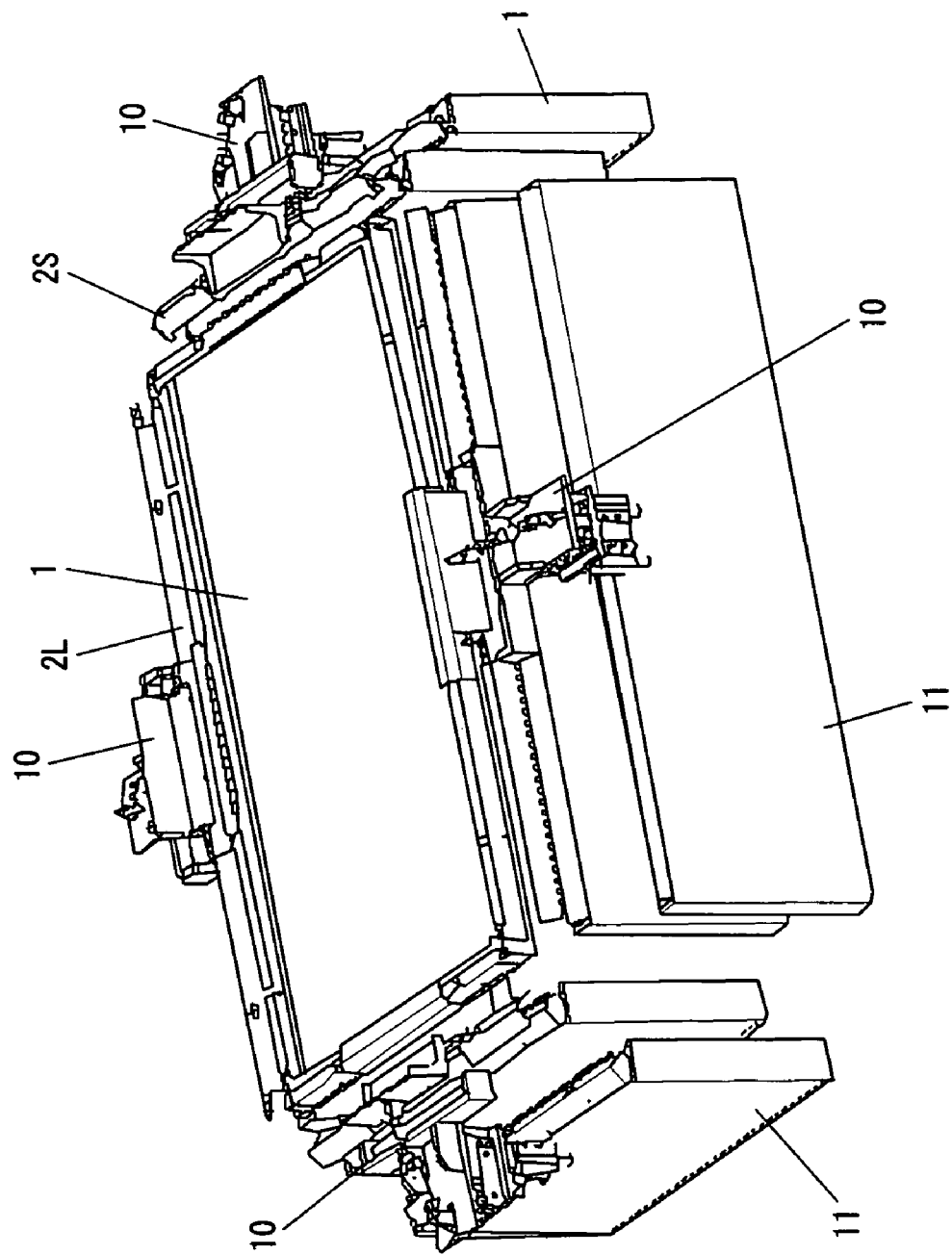

FIGS. 12 and 13 illustrate an apparatus for assembling a liquid crystal display according to a second exemplary embodiment of the invention.

As shown in FIGS. 12 and 13, in the second exemplary embodiment of the invention, an automatic screw driver unit 30 and a multi-axial robot 31 for multi-axial-transferring the automatic screw driver unit 30 are disposed on a board and backlight assembly 1. Accordingly, in the second exemplary embodiment of the invention, a process for aligning separated type top cases 2 on a quadrangular frame-shaped jig is omitted, and the separated type top cases 2 are directly arranged in and screw-coupled with the board and backlight assembly 1. Hence, a space for a top case arranging unit and a space for a screw coupling unit can be reduced.

In the first exemplary embodiment of the invention, the screw coupling and take-out unit is installed on a transfer path of the conveyer unit. On the other hand, in the second exemplary embodiment of the invention, the automatic screw driver unit 30 and the multi-axial robot 31 constituting the screw coupling unit are installed over the board and backlight assembly 1 at a aligning location of the separated type top cases 2. Accordingly, in the second exemplary embodiment of the invention, the separated type top cases 2 are screw-coupled immediately after the separated type top cases 2 are arranged on the board and backlight assembly 1, and then the separated type top cases 2 are transferred to a take-out unit comprised of the conveyer unit.

A board and backlight supply unit in the second exemplary embodiment of the invention is substantially the same as that in the first exemplary embodiment of the invention. Since a controller in the second exemplary embodiment of the invention drives a cartridge 11 and a tilting unit 10 in a driving manner illustrated in FIGS. 8 to 10 and then drives the automatic screw driver unit 30 and the multi-axial robot 31, a control sequence of the controller may partially change as compared with the first exemplary embodiment of the invention.

Figure 14:
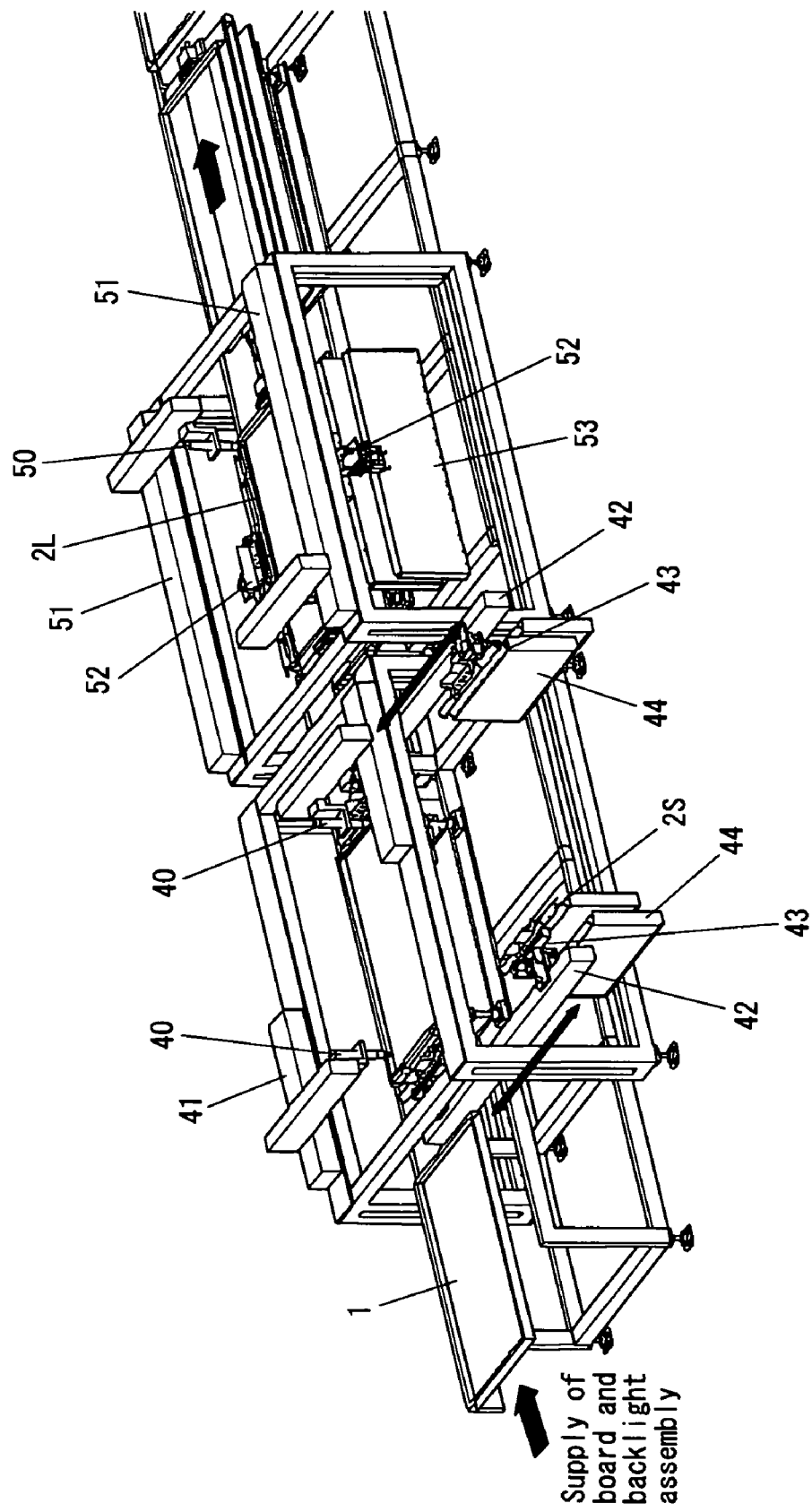
FIG. 14 is a perspective view of an apparatus for assembling a liquid crystal display according to a third exemplary embodiment of the invention.

FIG. 14 illustrates an apparatus for assembling a liquid crystal display according to a third exemplary embodiment of the invention.

As shown in FIG. 14, an assembly apparatus of a liquid crystal display according to the third exemplary embodiment of the invention has a board and backlight assembly supply unit, a first top case arranging unit, a second top case arranging unit, a take-out unit, and a controller for controlling operation timing of the above components. The controller may be implemented as a programmable logic controller (PLC) system.

Since configurations of the board and backlight assembly supply unit and the take-out unit are substantially the same as the second and third exemplary embodiments of the invention, a further description may be briefly made or may be entirely omitted.

The first top case arranging unit has a cartridge 44 into which shorter side top cases 2S are loaded, a tilting unit 43, a first multi-axial robot 42, a second multi-axial robot 41, an automatic screw driver unit 40, and the like. The shorter side top cases 2S of the first top case arranging unit are installed at both sorter sides of a board and backlight assembly 1 and are screw-coupled. The first multi-axial robot 42 forward and backward moves the cartridge 44 and the tilting unit 43 in a y-axis direction crossing an x-axis entry direction of the board and backlight assembly 1. The first multi-axial robot 42 backward moves the cartridge 44 and the tilting unit 43 so that the cartridge 44 and the tilting unit 43 do not obstruct a forward movement of the board and backlight assembly 1 transferred from the board and backlight assembly supply unit. After the board and backlight assembly 1 is aligned at a reference receiving location of the shorter side top cases 2S, the first multi-axial robot 42 forward moves the cartridge 44 and the tilting unit 43 at the reference receiving location. When the board and backlight assembly 1 assembled with the screw-coupled shorter side top cases 2S is transferred to the first top case arranging unit along an x-axis direction, the first multi-axial robot 42 backward moves the cartridge 44 and the tilting unit 43 so that the cartridge 44 and the tilting unit 43 do not obstruct a forward movement of the board and backlight assembly 1. The second multi-axial robot 41 transfers the automatic screw driver unit 40 in x-axis, y-axis, and z-axis directions to transfer the automatic screw driver unit 40 at a screw coupling location of the shorter side top cases 2S. The automatic screw driver unit 40 screw-couples the shorter side top cases 2S at the both sorter sides of the board and backlight assembly 1.

The second top case arranging unit has a cartridge 53 into which longer side top cases 2L are loaded, a tilting unit 52, a multi-axial robot 51 for transferring an automatic screw driver unit 50, and the like. The longer side top cases 2L of the second top case arranging unit are aligned at upper and lower longer sides of the board and backlight assembly 1 assembled with the screw-coupled shorter side top cases 2S and are screw-coupled. The cartridge 53 and the tilting unit 52 do not interfere with an x-axis transfer direction of the board and backlight assembly 1. Accordingly, the second top case arranging unit does not have a robot for backward moving the cartridge 53 and the tilting unit 52. The multi-axial robot 51 transfers the automatic screw driver unit 50 in x-axis, y-axis, and z-axis directions to transfer the automatic screw driver unit 50 at a screw coupling location of the longer side top cases 2L. The automatic screw driver unit 50 screw-couples the longer side top cases 2L at the upper and lower longer sides of the board and backlight assembly 1.

As described above, the assembly apparatus of the liquid crystal display according to the exemplary embodiments of the invention can automatically assemble the separated type chassis members to the board and backlight assembly. Hence, because the separated type chassis members are automatically assembled to large-sized liquid crystal displays, a rise in material cost and distribution cost caused by the large-sized separated type chassis members, the cost of a large-sized assembly equipment, an occupying space of the assembly equipment, and an increase in the number of assembly worker required can be solved. Further, an assembly speed and an assembly failure between the chassis members and the board and backlight assembly can be minimized.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for assembling a liquid crystal display comprising:
   a supply unit that supplies a board and backlight assembly including a backlight unit and a liquid crystal display panel arranged on the backlight unit at a predetermined assembly location;
   an assembly unit that in turn draws separated type chassis members from a cartridge, into which the separated type chassis members are loaded, and arranges the separated type chassis members at edges of the board and backlight assembly supplied at the predetermined assembly location; and
   a screw coupling unit that screw-couples the separated type chassis members arranged at the edges of the board and backlight assembly.

2. The apparatus of claim 1, wherein the assembly unit includes a tilting unit that in turn draws the separated type chassis members from the cartridge and rotates the separated type chassis members.

3. The apparatus of claim 1, wherein the screw coupling unit includes an automatic screw driver unit that inserts a screw into a screw tapping hole formed in the separated type chassis members arranged at the edges of the board and backlight assembly.

4. The apparatus of claim 2, wherein the assembly unit includes:
   a jig in which the separated type chassis members rotated by the tilting unit are arranged; and
   a robot that transfers the separated type chassis members arranged in the jig to the board and backlight assembly.

5. The apparatus of claim 4, wherein a chucking head of the tilting unit and a head of the robot adsorb the separated type chassis members using a vacuum pressure or a magnetic force.

6. The apparatus of claim 5, further comprising a controller that controls operations of the supply unit, the assembly unit, and the screw coupling unit.

7. The apparatus of claim 6, wherein the controller controls the assembly unit through a plurality of processes,
wherein the plurality of processes includes:
a process in which a height of the cartridge is lowered at a standby position and the chucking head of the tilting unit is directed toward the separated type chassis members loaded into the cartridge;
a process in which the cartridge is lifted up;
a process in which after the separated type chassis member is adsorbed to the chucking head of the tilting unit, the cartridge is lifted down;
a process in which a tilting cylinder of the tilting unit is driven and the chucking head adsorbing the separated type chassis member rotates clockwise;
a process in which the tilting unit is lifted up in a state where the chucking head rotates;
a process in which the tilting unit forward moves toward one of the board and backlight assembly and the jig in a state where the chucking head rotates;
a process in which the cartridge is lifted down;
a process in which the tilting unit backward moves; and
a process in which the tilting cylinder of the tilting unit is driven to counter-clockwise rotate the chucking head of the tilting unit, and the tilting unit and the cartridge are initialized at the standby position.

8. An apparatus for assembling a liquid crystal display comprising:
a supply unit that supplies a board and backlight assembly including a backlight unit and a liquid crystal display panel arranged on the backlight unit at a predetermined assembly location;
a first assembly unit that in turn draws first separated type chassis members from a first cartridge, into which the first separated type chassis members are loaded, and arranges the first separated type chassis members at one edge of the board and backlight assembly supplied at the predetermined assembly location;
a first screw coupling unit that screw-couples the first separated type chassis members arranged at the one edge of the board and backlight assembly;
a second assembly unit that in turn draws second separated type chassis members from a second cartridge, into which the second separated type chassis members are loaded, and arranges the second separated type chassis members at another edge of the board and backlight assembly supplied at the predetermined assembly location; and
a second screw coupling unit that screw-couples the second separated type chassis members arranged at the another edge of the board and backlight assembly.

9. The apparatus of claim 8, wherein the first assembly unit includes a first tilting unit that in turn draws the first separated type chassis members from the first cartridge to rotate the first separated type chassis members,
wherein the second assembly unit includes a second tilting unit that in turn draws the second separated type chassis members from the second cartridge to rotate the second separated type chassis members.

10. The apparatus of claim 8, wherein the first screw coupling unit includes a first automatic screw driver unit that inserts a screw into a screw tapping hole formed in the first separated type chassis members arranged at the one edge of the board and backlight assembly,
wherein the second screw coupling unit includes a second automatic screw driver unit that inserts a screw into a screw tapping hole formed in the second separated type chassis members arranged at the another edge of the board and backlight assembly.

11. The apparatus of claim 9, wherein the first assembly unit includes a first robot that backward moves the first cartridge and the first tilting unit along a direction crossing a transfer direction of the board and backlight assembly.

12. The apparatus of claim 10, wherein the first screw coupling unit includes a second robot that multi-axial-transfers the first automatic screw driver unit.

13. The apparatus of claim 12, wherein the second screw coupling unit includes a third robot that multi-axial-transfers the second automatic screw driver unit.

14. The apparatus of claim 9, wherein a chucking head of the first tilting unit adsorbs the first separated type chassis members using a vacuum pressure or a magnetic force,
wherein a chucking head of the second tilting unit adsorbs the second separated type chassis members using a vacuum pressure or a magnetic force.

15. The apparatus of claim 14, further comprising a controller that controls operations of the supply unit, the first and second assembly units, and the first and second screw coupling units.

16. The apparatus of claim 15, wherein the controller controls the first and second assembly units and the first and second screw coupling units through a plurality of processes,
wherein the plurality of processes includes:
a process in which a height of the first cartridge is lowered at a standby position and the chucking head of the first tilting unit is directed toward the first separated type chassis members loaded into the first cartridge;
a process in which the first cartridge is lifted up;
a process in which after the first separated type chassis member is adsorbed to the chucking head of the first tilting unit, the first cartridge is lifted down;
a process in which a tilting cylinder of the first tilting unit is driven to clockwise rotate clockwise the chucking head adsorbing the first separated type chassis member;
a process in which the first tilting unit is lifted up in a state where the chucking head of the first tilting unit rotates;
a process in which the first tilting unit forward moves toward both shorter sides of the board and backlight assembly in a state where the chucking head of the first tilting unit rotates;
a process in which the first cartridge is lifted down;
a process in which the first tilting unit backward moves;
a process in which the tilting cylinder of the first tilting unit is driven to counter-clockwise rotate the chucking head of the first tilting unit, and the first tilting unit and the first cartridge are initialized at the standby position;
a process in which the first screw coupling unit is driven to screw-couple the first separated type chassis members arranged at the both shorter sides of the board and backlight assembly;
a process in which a height of the second cartridge is lowered at the standby position and the chucking head of the second tilting unit is directed toward the second separated type chassis members loaded into the second cartridge;
a process in which the second cartridge is lifted up;

a process in which after the second separated type chassis member is adsorbed to the chucking head of the second tilting unit, the second cartridge is lifted down;

a process in which a tilting cylinder of the second tilting unit is driven to clockwise rotate the chucking head adsorbing the second separated type chassis member;

a process in which the second tilting unit is lifted up in a state where the chucking head of the second tilting unit rotates;

a process in which the second tilting unit forward moves toward upper and lower longer sides of the board and backlight assembly in a state where the chucking head of the second tilting unit rotates;

a process in which the second cartridge is lifted down;

a process in which the second tilting unit backward moves;

a process in which the tilting cylinder of the second tilting unit is driven to counter-clockwise rotate the chucking head of the second tilting unit, and the second tilting unit and the second cartridge are initialized at the standby position; and a process in which the second screw coupling unit is driven to screw-couple the second separated type chassis members arranged at the upper and lower longer sides of the board and backlight assembly.

\* \* \* \* \*